(12) United States Patent  
Wichowski

(10) Patent No.: US 8,294,396 B2
(45) Date of Patent: Oct. 23, 2012

(54) COMPACT FPGA-BASED DIGITAL MOTOR CONTROLLER

(75) Inventor: Robert P. Wichowski, Westfield, MA (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 582 days.

(21) Appl. No.: 12/501,660

(22) Filed: Jul. 13, 2009

(65) Prior Publication Data

US 2011/0006713 A1    Jan. 13, 2011

(51) Int. Cl.
*H02P 6/16* (2006.01)

(52) U.S. Cl. ............ 318/400.04; 318/400.01; 318/700; 318/254.1; 318/599; 318/600; 318/721; 318/722; 318/723; 318/724; 318/687; 318/268; 318/437; 318/400.29; 318/400.14

(58) Field of Classification Search ............ 388/809, 388/800; 318/400.01, 400.04, 400.06, 400.07, 318/400.12, 400.16, 400.24, 400.25, 400.39, 318/604, 254.1, 807, 700, 600, 661, 721–724, 318/687, 268, 437, 599, 400.29, 400.14
See application file for complete search history.

(56) References Cited

U.S. PATENT DOCUMENTS

| | | | | |
|---|---|---|---|---|
| 4,513,378 A * | 4/1985 | Antkowiak | ............... | 701/494 |
| 4,751,438 A | 6/1988 | Markunas | | |
| 5,350,988 A | 9/1994 | Le | | |
| 5,426,614 A * | 6/1995 | Harward | ............... | 365/225.7 |
| 5,498,979 A * | 3/1996 | Parlour et al. | ............... | 326/38 |
| 5,592,632 A * | 1/1997 | Leung et al. | ............... | 710/316 |
| 6,351,048 B1 | 2/2002 | Schob et al. | | |
| 6,808,345 B2 * | 10/2004 | Kato | ............... | 409/230 |
| 6,891,346 B2 | 5/2005 | Simmons et al. | | |
| 7,052,219 B2 * | 5/2006 | Kato | ............... | 409/230 |

(Continued)

FOREIGN PATENT DOCUMENTS

EP         05150432 A2    11/1992

(Continued)

OTHER PUBLICATIONS

European Search Report for International Application No. 10251247.2-1242, Oct. 5, 2010, 9 pages.

(Continued)

*Primary Examiner* — Rita Leykin
(74) *Attorney, Agent, or Firm* — Cantor Colburn LLP

(57) ABSTRACT

A compact field programmable gate array (FPGA)-based digital motor controller (102), a method, and a design structure are provided. The compact FPGA-based digital motor controller (102) includes a sensor interface (206) configured to receive sensor data from one or more sensors (104) and generate conditioned sensor data. The one or more sensors (104) provide position information for a DC brushless motor (108). The compact FPGA-based digital motor controller (102) also includes a commutation control (210) configured to create switching commands to control commutation for the DC brushless motor (108). The commutation control (210) generates commutation pulses from the conditioned sensor data of the sensor interface (206). The compact FPGA-based digital motor controller (102) also includes a time inverter (208) configured to receive the commutation pulses. The time inverter (208) converts the commutation pulses into a rotational speed of the DC brushless motor (108) to provide a linear feedback control parameter.

14 Claims, 3 Drawing Sheets

U.S. PATENT DOCUMENTS

| | | | |
|---|---|---|---|
| 7,245,096 B2 | 7/2007 | Echazarreta | |
| 7,245,103 B2 | 7/2007 | Chapman et al. | |
| 7,248,006 B2 * | 7/2007 | Bailey et al. | 318/400.4 |
| 7,332,884 B2 | 2/2008 | Rozman et al. | |
| 7,362,070 B2 | 4/2008 | Games et al. | |
| 7,466,088 B2 | 12/2008 | Romenesko et al. | |
| 7,489,097 B2 * | 2/2009 | Fu et al. | 318/400.01 |
| 7,564,208 B2 * | 7/2009 | Bailey et al. | 318/567 |
| 7,788,505 B2 * | 8/2010 | Porter et al. | 713/193 |
| 7,895,560 B2 * | 2/2011 | Lovell | 716/119 |
| 8,023,338 B2 * | 9/2011 | Kurjanowicz | 365/189.05 |
| 2001/0045941 A1 * | 11/2001 | Rosenberg et al. | 345/161 |
| 2005/0212472 A1 | 9/2005 | Chapman et al. | |
| 2008/0018278 A1 | 1/2008 | Ta et al. | |
| 2008/0092893 A1 * | 4/2008 | Boyle et al. | 128/204.21 |
| 2008/0247735 A1 | 10/2008 | Kazanzides et al. | |
| 2010/0023336 A1 * | 1/2010 | Shmunk | 704/503 |

FOREIGN PATENT DOCUMENTS

| | | |
|---|---|---|
| EP | 0812057 A1 | 12/1997 |
| JP | 03-075567 | 3/1991 |
| JP | 5227014 A | 9/1993 |
| JP | 05508297 A | 11/1993 |
| JP | 2004242389 | 8/2004 |
| JP | 2005102377 A | 4/2005 |
| WO | WO2004004109 A2 | 1/2004 |

OTHER PUBLICATIONS shiva@ishnatek.Com: "Implementing A Brushless DC Motor Controller on an IGLOO FPGA", Ishnatek Systems & Services Private Limited, Date Unknown, www.ishnatek.com, 12 pages.

url:http://www.eetasia.com: "Implementing A Brushless DC Motor Controller on an IGLOO FPGA", XP-002600282, Sep. 8, 2010, Retrieved from the Internet, 12 pages.

url:http://www.actel.com/products: Miniature Motor Control Daughter Card for Actel IGLOO Icicle Kit, / XP-002601681, Sep. 8, 2010, Retrieved from the Internet, 4 pages.

Craig Hackney: "FPGA Motor Control Reference Design", Retrieved from the Internet, XP-002600283, Sep. 8, 2010, 15 pages.

url:http://www.xilinx.com/support: "FPGA Motor Control Reference Design", Retrieved from the Internet, XP-002600283, Sep. 8, 2010, 15 pages.

Office Action dated Jul. 3, 2012 for Japanese Patent Application No. 2010-142133.

* cited by examiner

US 8,294,396 B2

COMPACT FPGA-BASED DIGITAL MOTOR CONTROLLER

BACKGROUND OF THE INVENTION

The subject matter disclosed herein generally relates to digital motor controllers, and more particularly to compact field programmable gate array (FPGA) based digital motor controllers.

A brushless direct current (DC) motor can use switches to electrically control commutation. One or more sensors can be used to determine position or speed information for feedback control of the brushless DC motor. When sensors are used that provide timing information, commutation control may be non-linear with respect to rotational speed of the motor. Non-linear period information complicates control logic, which can result in demanding mathematical calculations and complex algorithms for accurate control. Such control logic typically requires a microprocessor and accompanying computer system control elements, such as non-volatile memory, volatile memory, arbitration logic, operating system software, and application software in the motor control loop. The use of a microprocessor and computer system control elements may be unsuitable for certain environments that are geometrically constrained and/or subject to harsh environmental conditions, for instance, high radiation environments.

BRIEF DESCRIPTION OF THE INVENTION

According to one aspect of the invention, a compact field programmable gate array (FPGA)-based digital motor controller is provided. The compact FPGA-based digital motor controller includes a sensor interface configured to receive sensor data from one or more sensors and generate conditioned sensor data. The one or more sensors provide position information for a DC brushless motor. The compact FPGA-based digital motor controller also includes a commutation control configured to create switching commands to control commutation for the DC brushless motor. The commutation control generates commutation pulses from the conditioned sensor data of the sensor interface. The compact FPGA-based digital motor controller also includes a time inverter configured to receive the commutation pulses. The time inverter converts the commutation pulses into a rotational speed of the DC brushless motor to provide a linear feedback control parameter.

According to yet another aspect of the invention, a method for an FPGA-based digital motor controller is provided. The method includes receiving sensor data from one or more sensors indicating position information for a DC brushless motor. The method further includes generating conditioned sensor data at a sensor interface implemented in hardware circuitry of the compact FPGA-based digital motor controller. The method also includes generating commutation pulses from the conditioned sensor data at a commutation control implemented in hardware circuitry of the compact FPGA-based digital motor controller. The method additionally includes converting the commutation pulses into a rotational speed of the DC brushless motor at a time inverter implemented in hardware circuitry of the compact FPGA-based digital motor controller to provide a linear feedback control parameter. The method further includes creating switching commands at the commutation control, to control commutation for the DC brushless motor.

A further aspect of the invention is design structure for a compact FPGA-based digital motor controller tangibly embodied in a machine-readable medium. The design structure includes a sensor interface configured to receive sensor data from one or more sensors and generate conditioned sensor data, where the one or more sensors provide position information for a DC brushless motor. The design structure further includes a commutation control configured to create switching commands to control commutation for the DC brushless motor, the commutation control generating commutation pulses from the conditioned sensor data of the sensor interface. The design structure additionally includes a time inverter configured to receive the commutation pulses from the commutation control and convert the commutation pulses into a rotational speed of the DC brushless motor to provide a linear feedback control parameter.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
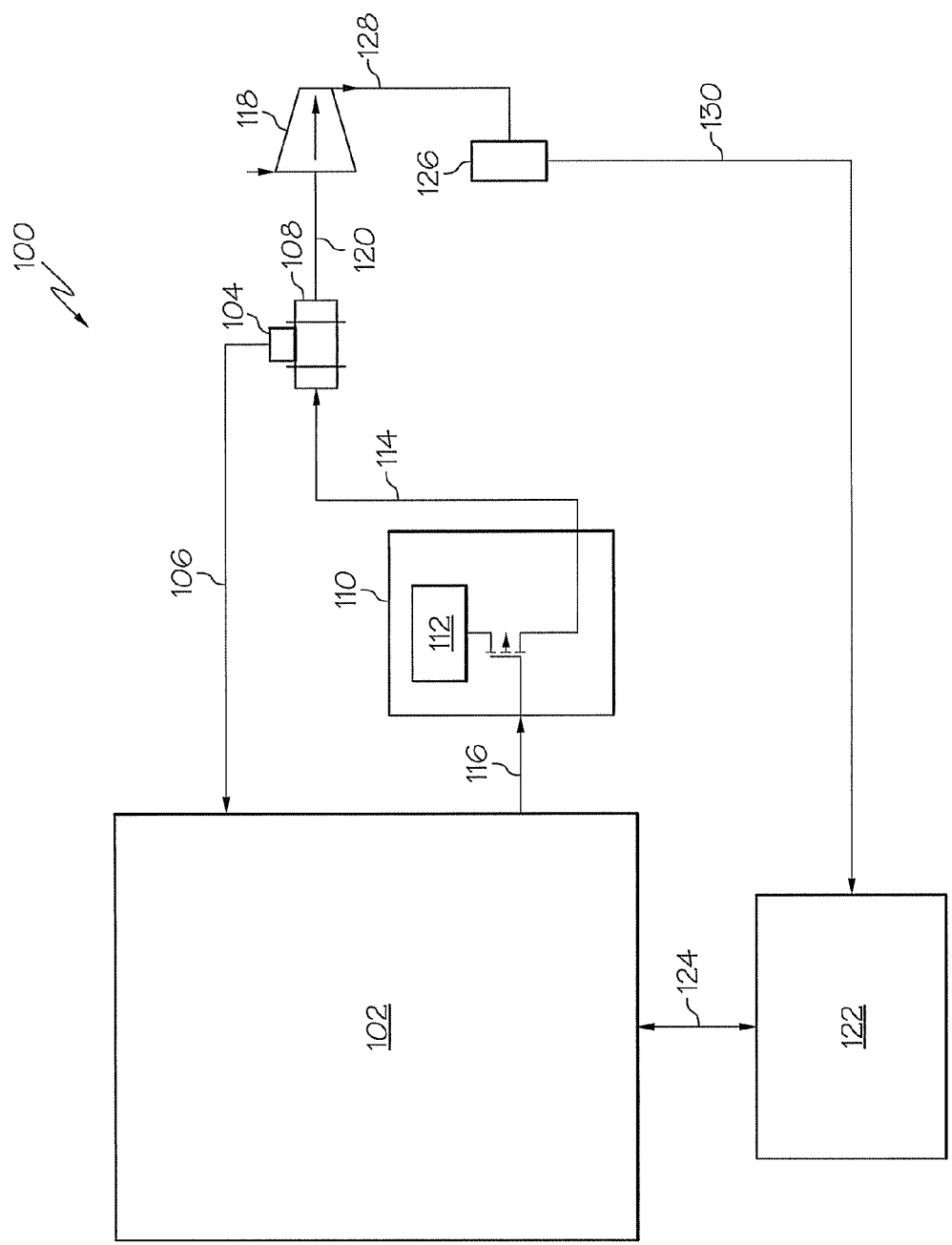
FIG. 1 is a block diagram of an exemplary embodiment of a system with a compact FPGA-based digital motor controller.

FIG. 1 illustrates a block diagram of an exemplary embodiment of a system 100 with a compact field programmable gate array (FPGA)-based digital motor controller 102. The compact FPGA-based digital motor controller 102 receives input data from one or more sensors 104 via sensor data link 106. The one or more sensors 104 may be Hall effect sensors that detect magnetic field changes due to rotation of a direct current (DC) brushless motor 108. In an exemplary embodiment, the one or more sensors 104 produce timing pulses responsive to a rotational position of the DC brushless motor 108. Motor drive transistors 110 switch a drive voltage source 112 onto motor drive link 114, providing switched current to establish commutation for the DC brushless motor 108. Switch commands are driven from the compact FPGA-based digital motor controller 102 to the motor drive transistors 110 using switch command link 116. Mechanical rotation of the DC brushless motor 108 can drive a rotary actuator 118 coupled through mechanical linkage 120. The mechanical linkage 120 may include gearing and other components (not depicted).

The compact FPGA-based digital motor controller 102 may receive commands from a system controller 122 through a communication link 124. The system controller 122 can monitor the rotary actuator 118 using system sensors 126. An actuator feedback link 128 provides a feedback path between the rotary actuator 118 and the system sensors 126. A system sensor data link 130 can be used to pass data from the system sensors 126 to the system controller 122. In the embodiment depicted in FIG. 1, the compact FPGA-based digital motor controller 102 performs closed-loop feedback control of the DC brushless motor 108, while the system controller 122 provides closed-loop feedback control of the rotary actuator 118.

In an exemplary embodiment, the system controller 122 provides control and configuration commands to the compact FPGA-based digital motor controller 102 and may also read status data from the compact FPGA-based digital motor controller 102. The system controller 122 can communicate with multiple instances of the compact FPGA-based digital motor controller 102 to command multiple instances of the DC brushless motor 108 and the rotary actuator 118 as part of a larger control system.

Although the compact FPGA-based digital motor controller 102 is depicted as a single block, it will be understood that the functionality implemented within the compact FPGA-based digital motor controller 102 can be distributed over multiple FPGAs. FPGAs are semiconductor devices that can be configured after manufacturing according to hardware description language (HDL) files. HDL files may be implemented in a variety of formats, such as very high-speed integrated circuit hardware description language (VHDL) and/or Verilog files. As used herein, the term "FPGA" can refer to any programmable logic device capable of performing closed-loop digital motor control absent software execution.

Figure 2:
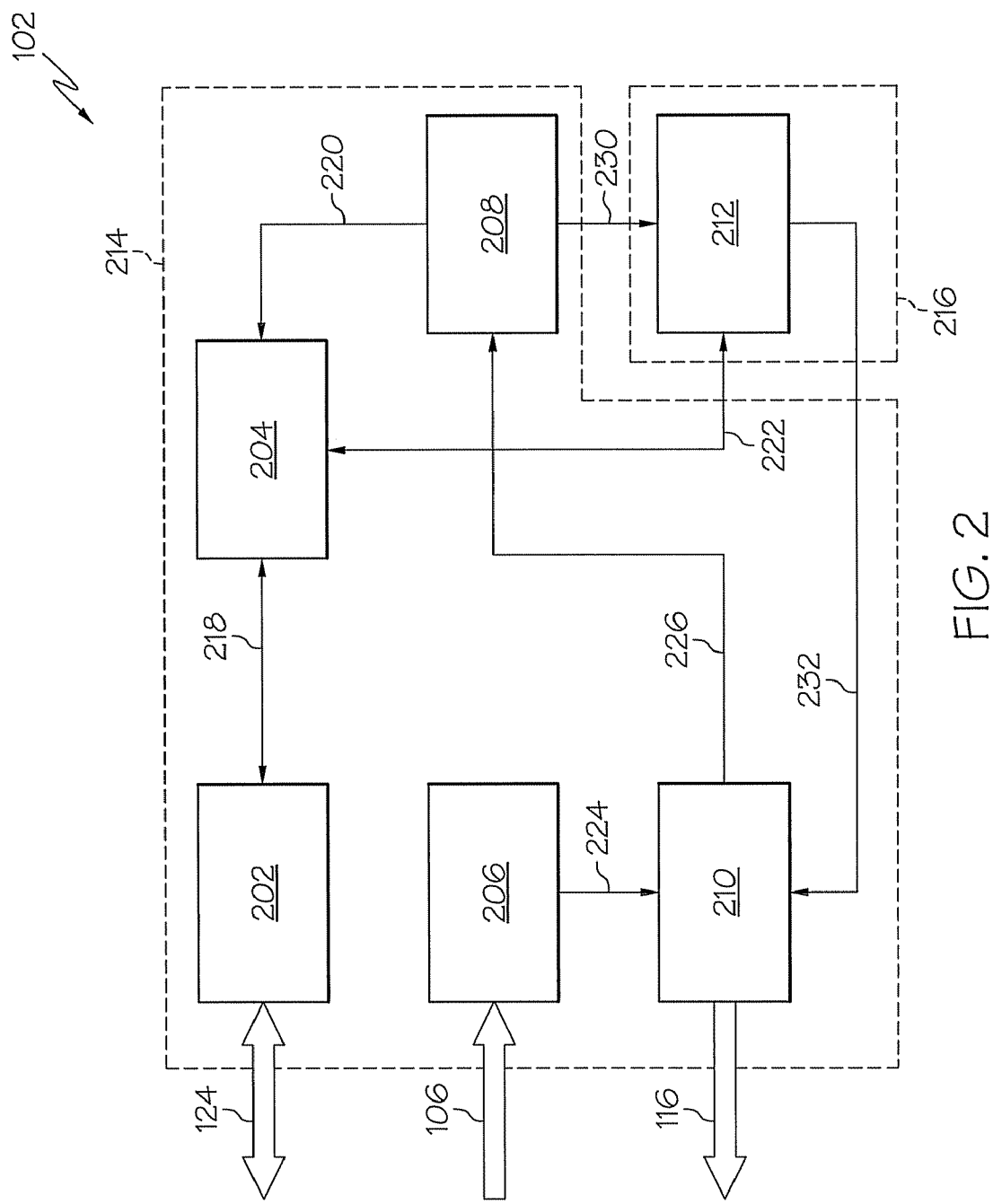
FIG. 2 depicts a block diagram of a compact FPGA-based digital motor controller.

FIG. 2 depicts further details of an embodiment of the compact FPGA-based digital motor controller 102. As illustrated in FIG. 2, the compact FPGA-based digital motor controller 102 includes hardware circuitry for a communication interface 202, data registers 204, sensor interface 206, time inverter 208, commutation control 210, and linear digital compensation filter 212. The communication interface 202, data registers 204, sensor interface 206, time inverter 208, commutation control 210, and linear digital compensation filter 212 can be implemented in a single compact FPGA device or distributed between multiple compact FPGA devices. In one embodiment, the communication interface 202, data registers 204, sensor interface 206, time inverter 208, and commutation control 210 are grouped in a first compact FPGA 214, while the linear digital compensation filter 212 is included in a second compact FPGA 216. This configuration may enable a common implementation of the first compact FPGA 214 and customized implementations of multiple instances of the second compact FPGA 216 to support multiple configurations of the DC brushless motor 108 and the rotary actuator 118 of FIG. 1 as part of a larger control system.

Both the first compact FPGA 214 and the second compact FPGA 216 can be implemented using antifuse (one-time programmable) technology to decrease susceptibility to radiation, such as alpha particles, which can cause circuits to malfunction. Thus, implementing the compact FPGA-based digital motor controller 102 in antifuse technology may increase overall reliability of the system 100 of FIG. 1, particularly in high-radiation environments. The physical area of the first compact FPGA 214 and the second compact FPGA 216 may be about 1 inch-square (2.54 centimeters-square), where the first compact FPGA 214 and the second compact FPGA 216 contain about 100,000 gates each. It will be understood that the physical dimensions and number of gates for the first compact FPGA 214 and the second compact FPGA 216 can vary within the scope of the invention.

The communication interface 202 is coupled to the communication link 124 to provide bidirectional communication with the system controller 122 of FIG. 1. The communication interface 202 may support a variety of communication protocols and standards known in the art, such as RS-485 to support point-to-point and multi-drop bus communication. Data path 218 provides a bidirectional communication link between the communication interface 202 and the data registers 204. The communication interface 202 can perform communication protocol conversion, enabling the system controller 122 of FIG. 1 to read and write values in the data registers 204. The data registers 204 may store a variety of configuration parameters, commands, and status information. For example, the data registers 204 can interface with the time inverter 208 and linear digital compensation filter 212 via data path 220 and data path 222 respectively.

The sensor interface 206 receives sensor data from the sensor data link 106 and can provide conditioned sensor data to the commutation control 210 using data path 224. The sensor data received at the sensor interface 206 from the one or more sensors 104 of FIG. 1 may be formatted as digital position data. For example, each of the one or more sensors 104 can generate a pulse as a rotor of the DC brushless motor 108 of FIG. 1 rotates in close physical proximity to a given sensor of the one or more sensors 104. The sensor interface 206 can use edge detection logic to trigger one or more timers to start, stop, and/or capture time values as transitional edges are detected. Timers may be included in the sensor interface 206 and/or in the commutation control 210.

The commutation control 210 can convert values received from the sensor interface 206 into commutation pulse data. The commutation pulse data may be formatted as time values indicating elapsed time between a common position and/or multiple positions relative to the DC brushless motor 108 of FIG. 1. The commutation pulse data is sent to the time inverter 208 via data path 226.

In an exemplary embodiment, the time inverter 208 performs a mathematical inversion of time values from the commutation pulse data and outputs a rotational speed in revolutions-per-minute (RPM). The time inverter 208 is implemented exclusively in hardware circuitry and performs the mathematical inversion of time values (1/time) without software assistance to provide a linear feedback control parameter for controlling the DC brushless motor 108 of FIG. 1. The time inverter 208 may include scalable parameters to control the accuracy of the calculations. In an exemplary embodiment, the accuracy of the time inverter 208 is scalable between 24 and 48 bits. The time inverter 208 may also support additional accuracy ranges. Converting non-linear commutation pulse data to RPM provides linearization to simplify closed loop control logic. Further or alternate scaling, such as unit conversion may be performed prior to passing resulting data values to the data registers 204 on data path 220 and to the linear digital compensation filter 212 on data path 230. Speed data passed to the data registers 204 can be read by the system controller 122 of FIG. 1 using the communication interface 202. Speed data passed to the linear digital compensation filter 212 supplies a linear feedback control parameter to determine an error value for controlling the DC brushless motor 108 of FIG. 1.

The linear digital compensation filter 212 provides compensation logic for stable control of the DC brushless motor 108 of FIG. 1. The linear digital compensation filter 212 may include one or more digital filter stages, such as an infinite impulse response (IIR) filter or a finite impulse response (FIR) filter. The linear digital compensation filter 212 may also include control loop logic for implementing any combination of proportional, integral, and/or differential control. A commanded speed value can be received from the data registers 204, in addition to one or more gain values and filter coefficients. The values from the time inverter 208 provide control loop feedback for linear digital control. This avoids complexity that may be associated with more advanced control loop designs, such as non-linear state space control. The linear digital compensation filter 212 drives an output on data path 232 that attempts to reduce an error value between a commanded value and the actual value determined by the time inverter 208. In an exemplary embodiment, the output on data path 232 is a compensation command for the commutation control 210, which may be in a pulse-width-modulation (PWM) command.

The commutation control 210 converts compensation commands from the linear digital compensation filter 212 into switching commands to output on the switch command link 116. The commutation control 210 may issue commands as PWM cycles with an adjustable duty cycle and/or frequency. In an exemplary embodiment, the commutation control 210 implements predictive control to avoid noise induced errors. The predictive control can include filtering self-generated noise. The commutation control 210 may use conditioned sensor data generated by the sensor interface 206 to determine when an error condition likely exists. For example, the commutation control 210 can determine that the rate of change between position data is too fast, indicating that false pulses may be present. The commutation control 210 can maintain a switching sequence from a previous switching cycle or issue no switching commands until the error condition is removed.

It will be understood that data paths 220-232 may be combined into any combination of shared data path. Sharing data paths can reduce the amount of resources dedicated to routing data paths within the compact FPGA-based digital motor controller 102.

Figure 3:
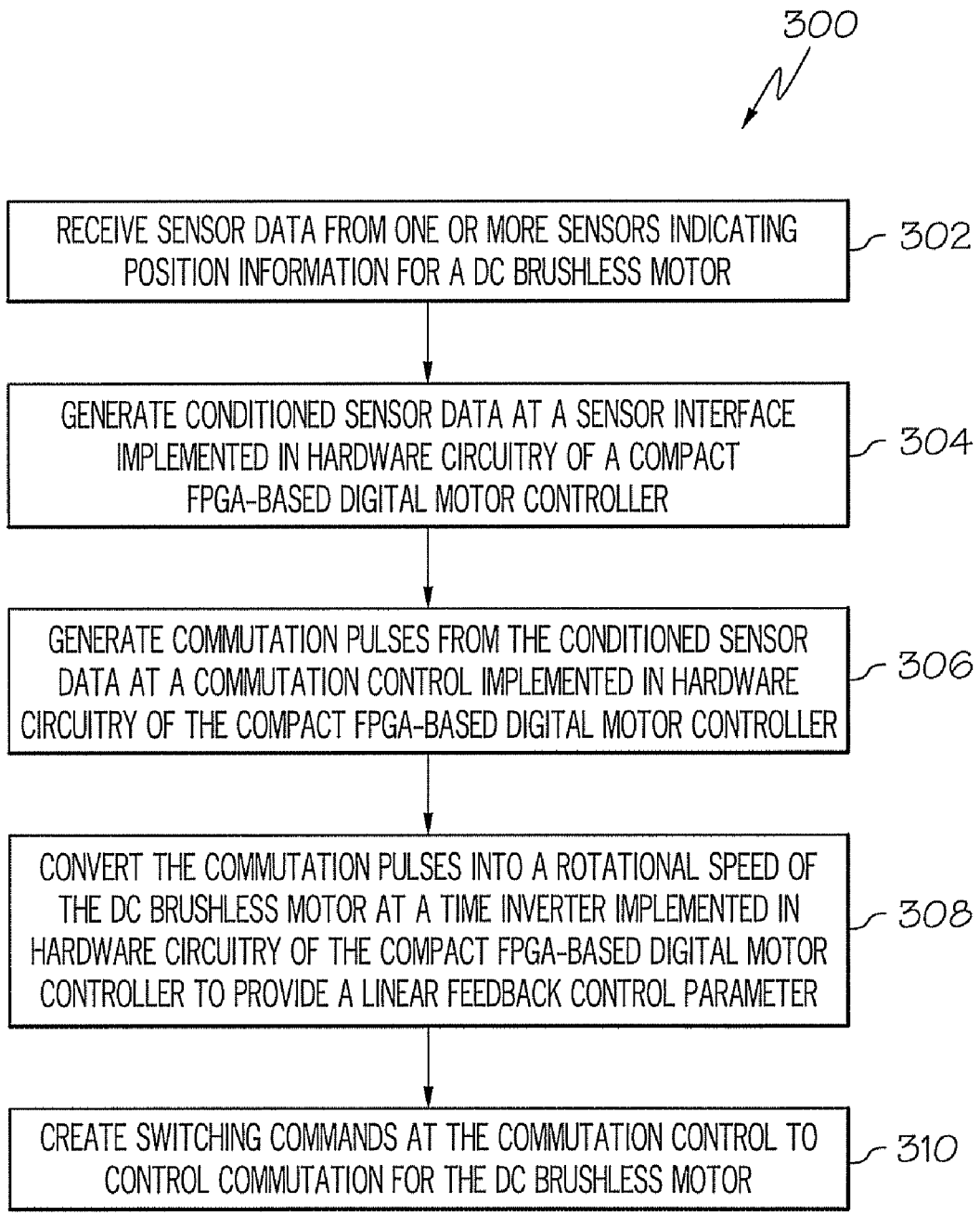
FIG. 3 depicts a process for providing a compact FPGA-based digital motor controller.

FIG. 3 depicts a process 300 for providing a compact FPGA-based digital motor controller, such as the compact FPGA-based digital motor controller 102 of FIGS. 1 and 2. At block 302, the sensor interface 206 receives sensor data from one or more sensors 104 indicating position information for DC brushless motor 108. At block 304, the sensor interface 206 generates conditioned sensor data. At block 306, commutation control 210 generates commutation pulses from the conditioned sensor data. At block 308, time inverter 208 converts the commutation pulses into a rotational speed of the DC brushless motor 108 to provide a linear feedback control parameter. At block 310, commutation control 210 creates switching commands to control commutation for the DC brushless motor 108. Data registers 204 can be used to store command and status information, with communication interface 202 providing communication between the data registers 204 and system controller 122 of FIG. 1. Linear digital compensation filter 212 may receive the rotational speed from the time inverter 208 and a speed command from the data registers 204, outputting a compensation command to the commutation control 210 responsive to the rotational speed and the speed command. As previously described, the commutation control 210 can include additional functionality, such as performing predictive control to filter self-generated noise.

As described above, embodiments of the invention may be embodied in the form of hardware or any processes and/or apparatuses for practicing the embodiments. The invention may also be embodied in the form of a design structure for the compact FPGA-based digital motor controller 102 of FIGS. 1 and 2 tangibly embodied in a machine-readable medium, such as a floppy diskette, CD ROM, DVD, flash drive, solid-state device, hard drive, or any other computer readable storage medium. One or more HDL files and/or supporting library files stored on one or more machine-readable mediums can provide the functional structure to program one or more FPGA devices to implement the compact FPGA-based digital motor controller 102. The design structure can be encoded in one or more FPGA devices, such as the first compact FPGA 214 and the second compact FPGA 216, by physically modifying the internal resistance of connections in each FPGA device to establish conductive paths for electrical current to flow.

Technical effects include a compact FPGA-based digital motor controller. Performing a time inversion of position information for a DC brushless motor in hardware rather than software can avoid use of a microprocessor, computer system components, and software, resulting in a geometrically compact solution for DC brushless motor control. FPGA-based time inversion circuitry enables the use of a digital linear closed loop compensation filter instead of more complex non-linear controls. Converting time data into RPM for closed loop control may further simplify the control logic. The compact FPGA-based digital motor controller can also avoid the use of analog circuits to reduce board area and increase reliability. Implementing the compact FPGA-based digital motor controller in antifuse technology may further enhance reliability in high radiation environments, such as high altitude or space applications.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A compact field programmable gate array (FPGA)-based digital motor controller (102) comprising:
   a sensor interface (206) implemented in hardware circuitry configured to receive sensor data from one or more sensors (104) and generate conditioned sensor data, the one or more sensors (104) to provide position information for a direct current (DC) brushless motor (108);
   a commutation control (210) implemented in hardware circuitry configured to create switching commands to control commutation for the DC brushless motor (108), the commutation control (210) generating commutation pulses from the conditioned sensor data of the sensor interface (206); and
   a time inverter (208) implemented in hardware circuitry configured to receive the commutation pulses from the commutation control (210) and convert the commutation pulses into a rotational speed of the DC brushless motor (108) to provide a linear feedback control parameter.

2. The compact FPGA-based digital motor controller (102) of claim 1 further comprising:
   data registers (204) configured to store command and status information; and
   a communication interface (202) in communication with the data registers (204) to provide communication with a system controller (122).

3. The compact FPGA-based digital motor controller (102) of claim 2 further comprising:
   a linear digital compensation filter (212) configured to receive the rotational speed from the time inverter (208) and a speed command from the data registers (204), the linear digital compensation filter (212) outputting a compensation command to the commutation control (210) responsive to the rotational speed and the speed command.

4. The compact FPGA-based digital motor controller (102) of claim 3 wherein the time inverter (208) is implemented in a first compact FPGA (214) and the linear digital compensation filter (212) is implemented in a second compact FPGA (216).

5. The compact FPGA-based digital motor controller (102) of claim 1 wherein accuracy of the time inverter (208) is scalable.

6. The compact FPGA-based digital motor controller (102) of claim 1 wherein the commutation control (210) performs predictive control to filter self-generated noise.

7. The compact FPGA-based digital motor controller (102) of claim 1 wherein the compact FPGA-based digital motor controller (102) is implemented in antifuse technology.

8. A method for controlling a motor with a compact field programmable gate array (FPGA)-based digital motor controller (102) comprising:
  receiving sensor data from one or more sensors (104) indicating position information for a direct current (DC) brushless motor (108);
  generating conditioned sensor data at a sensor interface (206) implemented in hardware circuitry of the compact FPGA-based digital motor controller (102);
  generating commutation pulses from the conditioned sensor data at a commutation control (210) implemented in hardware circuitry of the compact FPGA-based digital motor controller (102);
  converting the commutation pulses into a rotational speed of the DC brushless motor (108) at a time inverter (208) implemented in hardware circuitry of the compact FPGA-based digital motor controller (102) to provide a linear feedback control parameter; and
  creating switching commands at the commutation control (210) to control commutation for the DC brushless motor (108).

9. The method of claim 8 further comprising:
  storing command and status information in data registers (204) of the compact FPGA-based digital motor controller (102); and
  providing communication between the data registers (204) and a system controller (122) via a communication interface (202) of the compact FPGA-based digital motor controller (102).

10. The method of claim 9 further comprising:
  receiving the rotational speed from the time inverter (208) and a speed command from the data registers (204) at a linear digital compensation filter (212) of the compact FPGA-based digital motor controller (102); and
  outputting a compensation command to the commutation control (210) responsive to the rotational speed and the speed command.

11. The method of claim 10 wherein the time inverter (208) is implemented in a first compact FPGA (214) and the linear digital compensation filter (212) is implemented in a second compact FPGA (216).

12. The method of claim 8 wherein accuracy of the time inverter (208) is scalable.

13. The method of claim 8 wherein the commutation control (210) performs predictive control to filter self-generated noise.

14. The method of claim 8 wherein the compact FPGA-based digital motor controller (102) is implemented in antifuse technology.

* * * * *